United States Patent
Blanchard

(10) Patent No.: US 7,154,848 B2
(45) Date of Patent: Dec. 26, 2006

(54) METHODS AND APPARATUS FOR GENERATING A MULTIPLEXED COMMUNICATION SIGNAL

(75) Inventor: Scott D. Blanchard, Mesa, AZ (US)

(73) Assignee: General Dynamics Corporation, Scottsdale, AZ (US)

(*) Notice: Subject to any disclaimer, the term of this patent is extended or adjusted under 35 U.S.C. 154(b) by 1037 days.

(21) Appl. No.: 10/158,296

(22) Filed: May 29, 2002

(65) Prior Publication Data
US 2003/0223465 A1    Dec. 4, 2003

(51) Int. Cl.
    *H04J 11/00* (2006.01)
(52) U.S. Cl. .............. 370/210; 370/342; 370/347; 370/535; 375/130
(58) Field of Classification Search ............ None
    See application file for complete search history.

(56) References Cited

U.S. PATENT DOCUMENTS

| | | | |
|---|---|---|---|
| 4,558,302 A | 12/1985 | Welch | |
| 4,701,745 A | 10/1987 | Waterworth | |
| 5,783,969 A | 7/1998 | Luz | |
| 5,825,762 A | 10/1998 | Kamin, Jr. et al. | |
| 5,834,972 A | 11/1998 | Schiemenz, Jr. et al. | |
| 5,839,100 A * | 11/1998 | Wegener | 704/220 |
| 5,940,445 A | 8/1999 | Kamin, Jr. | |
| 6,157,681 A | 12/2000 | Daniel et al. | |
| 2003/0073463 A1 * | 4/2003 | Shapira | 455/562 |
| 2003/0142699 A1 * | 7/2003 | Suzuki et al. | 370/535 |

OTHER PUBLICATIONS

"Universal Noiseless Coding", Lee D. Davisson, IEEE Transactions on Information Theory, Nov. 1973, vol. 19, No. 6, pp. 783-795.
"Sequence Time Coding For Data Compression", Thomas J. Lynch, IEEE, Oct. 1966, vol. 54, pp. 1490-1491.
"Universal Codeword Sets And Representations Of The Integers", Peter Elias, IEEE Transactions on Information Theory, Mar. 1975, vol. 21, No. 2, pp. 194-203.
"A Method For Construction Of Minimum Redundancy Codes", David A. Huffman, Proceedings of the Institute of Radio Engineers, Sep. 1952, vol. 40, pp. 1098-1101.
Universal Coding, Information, Prediction, And Estimation, Jorma Rissanen, IEEE Transactions on Information Theory, Jul. 1984, vol. 30, No. 4, pp. 629-636.
"Universal Modeling And Coding", Jorma Rissanen and Glen G. Langdon, Jr., IEEE Transactions on Information Theory, Jan. 1981, vol. 27, No. 1, pp. 12-23.
A Universal Algorithm For Sequential Data Compression, Jacob Ziv and Abraham Lempel, IEEE Transactions on Information Theory, May 1977, vol. 23, No. 3, pp. 337-343.
"Compression Of Individual Sequences Via Variable-Rate Coding", Jacob Ziv and Abraham Lempel, IEEE Transactions on Information Theory, Sep. 1978, vol. 24, No. 5, pp. 530-536.

* cited by examiner

*Primary Examiner*—Duc Ho
(74) *Attorney, Agent, or Firm*—Ingrassia Fisher & Lorenz

(57) ABSTRACT

Methods and apparatus are provided for generating for generating a multiplexed communication signal in a wireless communication system. The apparatus comprises inputs configured to receive digital communication signals, a transform matrix configured to transform the digital communication signals into transformed digital communication signals, and a processor configured to generate a scaling vector for the transformed digital communication signals. Furthermore, the apparatus further comprises an operator configured to produce a mantissa for each of the transformed digital communication signals with the scaling vector and a multiplexer configured to multiplex the mantissa for each of the transformed digital communication signals and the scaling vector to produce the multiplexed communication signal.

24 Claims, 4 Drawing Sheets

METHODS AND APPARATUS FOR GENERATING A MULTIPLEXED COMMUNICATION SIGNAL

BACKGROUND OF THE INVENTION

The present invention generally relates to communication systems, and more particularly to apparatus and methods for generating a multiplexed communication signal in a wireless communication system.

Wireless communication systems have continued to evolve and have become an essential component of modem society. Wireless communication systems provide numerous applications such as worldwide television, communications to remote areas, wide area data networks, global personal communications to hand-held portable telephones, broadband voice, video, and data. As the number of applications has increased and the number of users using the applications has increased, processes have been developed to accommodate the increased application and users.

One such process that has been developed to accommodate the increase in the number of applications and users is multiplexing. The process of multiplexing allows multiple signals to be sent on a single channel, and many forms of multiplexing have been developed to generate a multiplexed communication signal, including, but not limited to time multiplexing, frequency multiplexing, space multiplexing (e.g., Frequency-Division Multiplexing (FDM), Time-Division Multiplexing (TDM), Space-Division Multiplexing (SDM), Orthogonal Frequency Multiplexing (OFM), Code-Division Multiple Access (CDMA) multiplexing, Wideband CDMA (WCDMA) multiplexing, Time-Division Multiple Access multiplexing, Orthogonal Frequency Multiple Access (OFMA) multiplexing, and Frequency Division Multiple Access multiplexing (FDMA)). While multiplexing has increased the number of signals that can be sent on a single channel to accommodate numerous applications and users, other apparatus and processes are continually sought to improve the multiplexed communication signal generated by the foregoing and other multiplexing schemes, such as minimizing the bandwidth for a signal while maintaining a desired dynamic range.

In view of the foregoing, it should be appreciated that it would be desirable to provide apparatus for generating a multiplexed communication signal in order to minimize the bandwidth of individual signals of the multiplexed communication signal while preserving a desired dynamic range. In addition, it should be appreciated that it would be desirable to provide methods for generating a multiplexed communication signal in order to minimize the bandwidth of individual signals of the multiplexed communication signal while preserving a desired dynamic range. Furthermore, additional desirable features will become apparent to one skilled in the art from the drawings, foregoing background of the invention, following detailed description of a preferred exemplary embodiment and appended claims.

BRIEF SUMMARY OF THE INVENTION

In accordance with the present invention, an apparatus is provided for generating a multiplexed communication signal. The apparatus comprises inputs configured to receive digital communication signals, a transform matrix configured to transform the digital communication signals into transformed digital communication signals, and a processor configured to generate a scaling vector for the transformed digital communication signals. Furthermore, the apparatus further comprises an operator configured to produce a mantissa for each of the transformed digital communication signals with the scaling vector and a multiplexer configured to multiplex the mantissa for each of the transformed digital communication signals and the scaling vector to produce the multiplexed communication signal.

In accordance with the present invention, a method is also provided for generating a multiplexed communication signal. The method comprises receiving digital communication signals, transforming the digital communication signals into transformed digital communication signals, determining a scaling vector for the transformed digital communication signals, and generating a mantissa for each of the transformed digital communication signals with the scaling vector. In addition, the method comprises multiplexing the mantissa for each of the transformed digital communication signals and the scaling vector to produce the multiplexed communication signal.

BRIEF DESCRIPTION OF THE DRAWINGS

The present invention will hereinafter be described in conjunction with the appended drawing figures, wherein like numerals denote like elements, and.

DETAILED DESCRIPTION OF THE DRAWINGS

The following detailed description of a preferred embodiment is merely exemplary in nature and is not intended to limit the invention or the application and uses of the invention. Furthermore, there is no intention to be bound by any theory presented in the preceding background of the invention or the following detailed description of the drawings.

Figure 1:
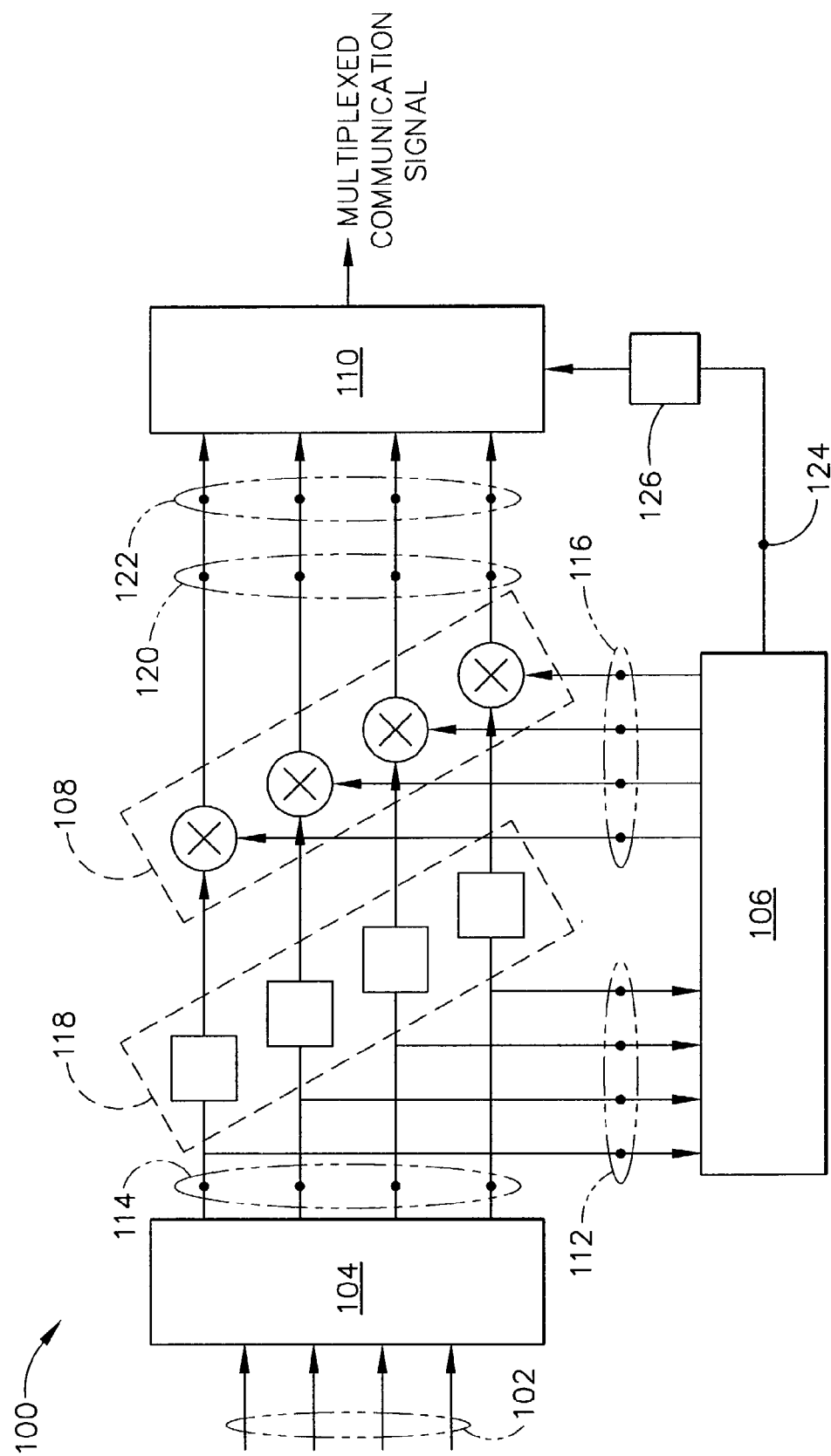
FIG. 1 is an apparatus for generating a multiplexed communication signal according to a preferred exemplary embodiment of the present invention.

Referring to FIG. 1, an apparatus 100 is illustrated for generating a multiplexed communication signal according to a preferred exemplary embodiment of the present invention. Generally, the apparatus 100 comprises inputs 102 configured to receive digital communication signals and a transform matrix 104 configured to transform the digital communication signals into transformed digital communication signals. In addition, the apparatus 100 comprises a processor 106 configured to generate a scaling vector for the transformed digital communication signals and an operator 108 configured to produce a mantissa for each of the transformed digital communication signals with the scaling vector. Furthermore, the apparatus 100 comprises a multiplexer 110 configured to multiplex the mantissa for each of the transformed digital communication signals and the scaling vector to produce the multiplexed communication signal.

The apparatus 100 of the present invention, and subsequently described apparatus and methods, are preferably utilized in a wireless communication system such as a satellite communication system, cellular communication system or other Personal Communication Systems (PCS). However, as can be appreciated by one of ordinary skill in the art, the principles discussed herein can be readily applied to other wireless based, radio, cable television (CATV), telephony as well as other data, voice, or a combination data and voice communications systems. Furthermore, as can be appreciated by one of ordinary skill in the art, the principles discussed herein can also be readily applied to systems where it is desirable to separate the antenna from the processing system such as RF monitoring and surveillance, direct finding, RADAR, and sonar.

The digital communication signals received at the inputs 102, which are binary encoded analog waveforms that can be generated using digital signal processing techniques known to those of ordinary skill in the art, and which represent the reception of received analog signals that are digitally encoded, and/or modulated, spread, and/or a multiplexed set of information streams, can be any number of digital representations of modulated data waveforms, voice waveforms, combination of data and voice waveforms, samples portions or RF, acoustic or optical receivers, or radar waveforms. According to a preferred embodiment of the present invention, the digital communication signals are Third Generation Partnership Project (3GPP) Wideband Code Division Multiple Access (WCDMA) Direct Sequence Spread Spectrum (DSSS) signals containing multiple data and/or voice users using different spreading codes. However, the present invention is applicable to digital communication signals in other modulation and multiple access schemes based upon spread-spectrum communication, such as Code Division Multiple Access (CDMA), Frequency Division Multiple Access (FDMA), Time Division Multiple Access (TDMA), or the like.

The digital communication signals received at the inputs 102 are provided to the transform matrix 104 for signal power distribution from one input to multiple outputs in a predetermined phase relationship. The transform matrix 104 can be implemented with any number of matrices that distribute the signal power of the digital communication signals from one input to multiple outputs in the predetermined relationship. For example, the transform matrix 104 can be a Fourier transform matrix or a Butler transform matrix. In addition, the transform matrix 104 can have any number of dimensions, and preferably dimensions of N-by-M (NXM), where N and M are the number of inputs and outputs, respectively, and N,and/or M is greater than or equal to two (2). Furthermore, the transform matrix 104 is preferably, but not necessarily, a digital transform matrix according to the present invention and the function provided by the transform matrix 104 is preferably performed at base band frequencies of the digital communication signals using combinatorial logic rather than performed on analog signals at Radio Frequencies (RF) using electromagnetic techniques provided by strip line couplers.

As the transform matrix 104 is digitally implemented in the preferred embodiment, the transform matrix can be programmed for multiple configurations corresponding to various digital transmitter and multiple-beam antenna configurations. An example of a digital transform matrix is described in U.S. Pat. No. 5,834,972, titled "METHOD AND SYSTEM IN A HYBRID MATRIX AMPLIFIER FOR CONFIGURING A DIGITAL TRANSFORMER," issued on Nov. 10, 1998 to Schiemenz, Jr. et al, which is hereby incorporated by reference (hereinafter referred to as the "Schiemenz Reference"). The transform matrix 104 configured as a digital transform matrix mathematically multiplies, multiplexes, and combines the digital communication signals. As a result, while each of the digital communication signals may originally have significant variations in peak magnitudes, the transformed digital communication signals produced by the transform matrix 104 will have reduced variations in the peak magnitudes as compared to the digital communication signals originally provided to the transform matrix 104.

The transformed digital communication signals generated by the transform matrix are provided to the processor 106 at processor inputs 112, which are coupled to the transform matrix outputs 114. The processor 106, which can be implemented with software, hardware, or a combination of hardware and software, receives the transformed digital communication signals presented at the processor inputs 112 and determines the scaling vector having an element (e.g., exponent) for each of the transformed digital signals, which can be utilized to reduce the resolution for representing the transformed while providing a suitable fidelity. The processor 106 can determine each element of the scaling vector for each of the binary strings corresponding to the transformed digital communication signals using any number of techniques known to those of ordinary skill in the art, which convert each of the binary strings to a digital floating point representation (i.e., sign bit, exponent, mantissa) For example, a sixteen (16) bit binary string can be represented with an eight (8) bit instantaneous fidelity with an eight (8) bit mantissa and a three (3) bit exponent. In addition, the processor 106 preferably evaluates the transformed digital communication signals for saturation conditions and corrects such saturation if such a condition exists as discussed in the Schiemenz Reference.

Once the scaling vector is determined by the processor 106, each of the elements of the scaling vector is provided by the processor 106 at processor outputs 116 for generation of a mantissa for each of the transformed digital communication signals. The processor outputs 116 are coupled to an operator 108, which preferably comprises one or more multipliers in accordance with the present invention. However, one of ordinary skill in the art will recognize that if the exponents are limited to powers-of-two, the operator 108 can be implemented in other manners, such as a selector that selects the mantissa from a subset of the binary string, or with a shifter that conducts a shifting operation based upon the exponent.

The operator 108 is also coupled to the transform matrix outputs 114 such that the operator 108 receives the transformed digital communication signals in addition to the scaling vector (i.e., elements of the scaling vector) from the processor 106. Preferably, the transformed matrix outputs 114 are coupled to the operator 108 with delays 118 to synchronize the transformed digital communication signals with the scaling vector generated by the processor 106. The operation performed by the operator 108 with the transformed digital communication signals and the scaling vector produces a mantissa for each of the transformed digital communication signals at the operator 120, which are coupled to the multiplexer inputs 122 of the multiplexer 110. As can be appreciated by one of ordinary skill in the art, the operator 108 can be incorporated into the functions provided by the processor 108, and the mantissa for each of the transformed digital communication signals can be provided by the processor 108 to the multiplexer 110.

In addition to the mantissa for each of the transformed digital communication signals, the multiplexer 110 is also configured to receive the scaling vector from the processor 106. The scaling vector can be provided to the multiplexer 110 in the form as presented to the operator 108 or preferably encoded before it is provided to the multiplexer 110. More specifically, the processor 106 preferably encodes the scaling vector and produces an encoded scaling vector, which is provided at an encoded output 124 that is coupled to the multiplexer 110, and preferably coupled to the multiplexer with a delay 126 to synchronize the encoded scaling vector and the corresponding mantissas produced by the operator 108.

Figure 2:
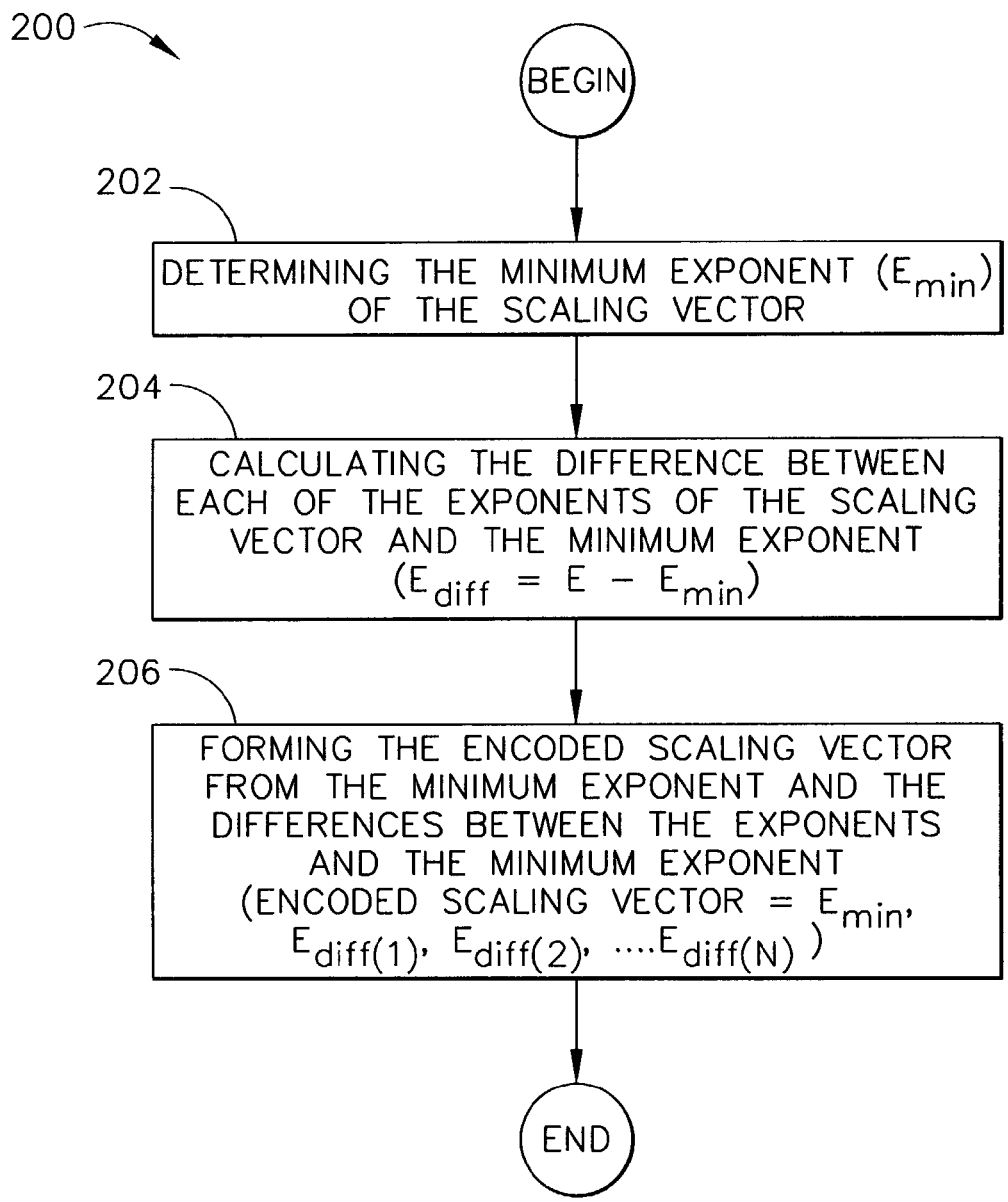
FIG. 2 is a method of encoding the scaling vector according to a preferred embodiment of the present invention.

Referring to FIG. 2, a method 200 for encoding the scaling vector is illustrated according to a preferred embodiment of the present invention. The method 200 comprises determining the minimum exponent ($E_{min}$) of the scaling vector 202 and calculating the difference between each of the elements (e.g., exponents) of the scaling vector and the minimum exponent 204 (i.e., $E_{diff}=E-E_{min}$). The method further comprises forming the encoded scaling vector from the minimum exponent and the differences between the exponents and the minimum exponent 206 (e.g., encoded scaling vector=$[E_{min}, E_{diff(1)}, E_{diff(2)}, \ldots, E_{diff(N)}]$, where N is the number of exponents contained in the original scaling vector, which also corresponds to the number of transformed digital communication signals.)

Figure 3:
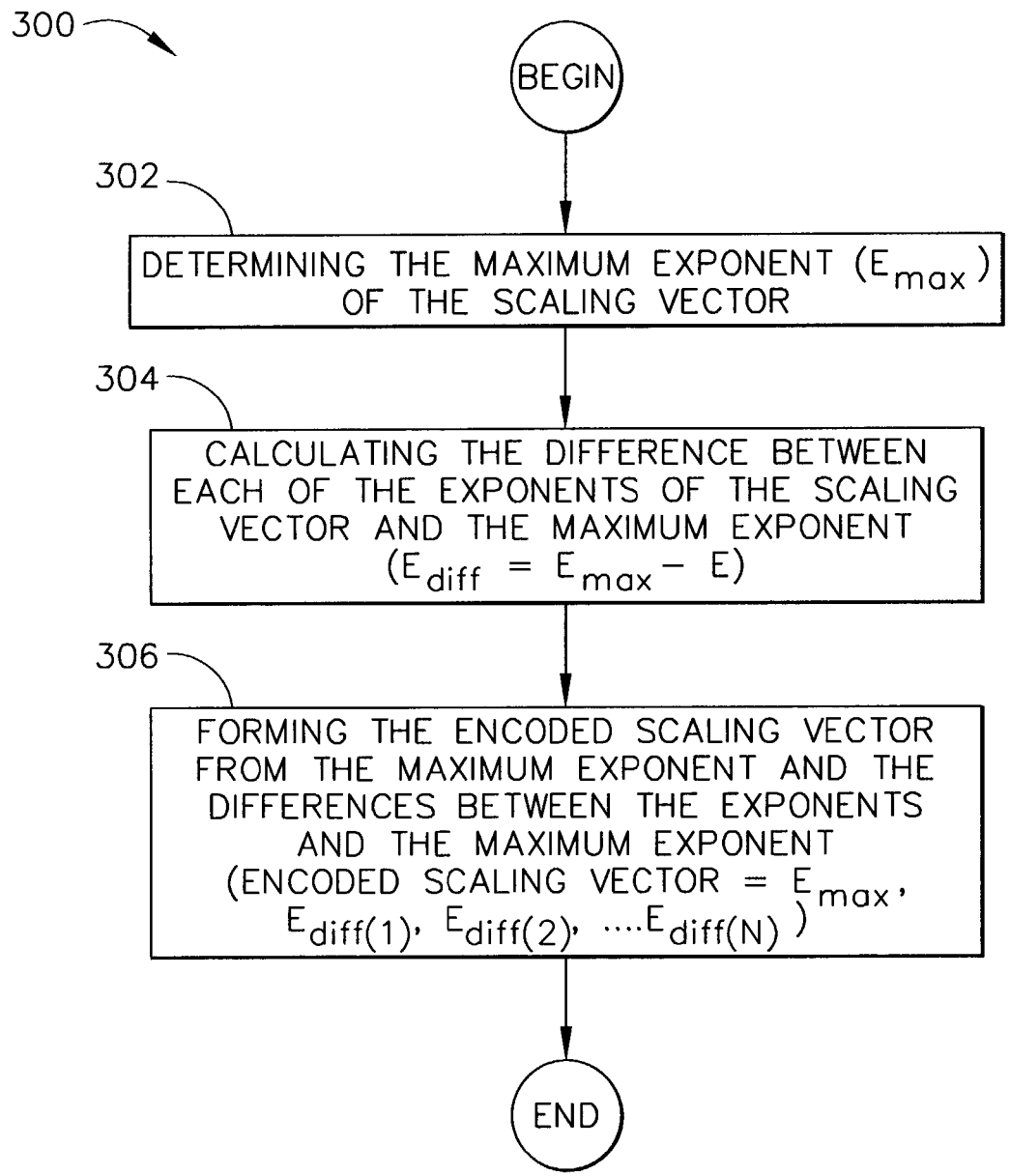
FIG. 3 is another method of encoding the scaling vector according to a preferred embodiment of the present invention and FIG. 4 is an apparatus for processing the multiplexed communication signal generating by the apparatus of FIG. 1 according to a preferred exemplary embodiment of the present invention.

Referring to FIG. 3, a second method 300 for encoding the scaling vector is illustrated according to a preferred exemplary embodiment of the present invention. The method 200 comprises determining the maximum exponent ($E_{max}$) of the scaling vector 302 and calculating the difference between the maximum exponent and each of elements (e.g., exponents) of the scaling vector 304 (i.e., $E_{diff}=E_{max}-E$). The method further comprises forming the encoded scaling vector from the maximum exponent and the differences between the maximum exponents and each of the exponents of the scaling vector 306 (e.g., encoded scaling vector=$[E_{min}, E_{diff(1)}, E_{diff(1)}, E_{diff(2)}, \ldots, E_{diff(N)}]$, where N is the number of exponents contained in the original scaling vector, which also corresponds to the number of transformed digital communication signals.)

As can be appreciated by one of ordinary skill in the art, the peak amplitude of each of the transformed digital signals are substantially similar and the bandwidth preferably provided to transmit the scaling vector will be less than or equal to the product of the bits representing the scaling vector and the number of inputs 102 to the transform matrix 104. For example, four (4) bits of dynamic range may be desirable, but each of the inputs 102 to the transform matrix 104 can be scaled with the selection of a single four (4) bit scaling element and selection of a one (1) bit scaling element for each of the inputs 102 to identify if the exponent of each of the inputs 102 greater than the single four (4) bit scaling element. Therefore, the scaling vector is provided with the number of bits of dynamic range (D) plus the number of input ports 102 (N) (i.e., D+N).

In accordance with another embodiment of the present invention, methods and apparatus well known to those of ordinary sill in the art can be utilized for encoding the scaling vector. For example, Huffman, Elias, Lempel-Ziv (e.g., LZW and LZ77) methods can be utilized in accordance with the present invention as well as adaptive methods implemented by Lynch-Davisson codes or Rissanen MDL. Furthermore, predictive encoding methods can be utilized in accordance with the present invention to select the encoding method and method parameters based upon present and past signal statistics and other constraints such as processing limitations, signal quality, and/or update latency, or the like, to produce the encoded scaling vector. (See U.S. Pat. No. 4,558,302, titled "HIGH SPEED DATA COMPRESSION AND DECOMPRESSION APPARATUS AND METHOD," issued on Dec. 10, 1985 to Welch, which is hereby incorporated by reference; U.S. Pat. No. 4,701,745, titled "DATA COMPRESSION SYSTEM," issued on Jan. 20, 1987 to Waterworth, which is hereby incorporated by reference; L. D. Davisson, UNIVERSAL NOISELESS CODING, IEEE Transactions on Information Theory, Vol. 19, No. 6, pp. 783–795, 1973, which is hereby incorporated by reference; T. J. Lynch, SEQUENCE TIME CODING FOR DATA COMPRESSION, Proc. IEEE, Vol. 54, pp. 1490–1491, October 1966, which is hereby incorporated by reference; Peter Elias, UNIVERSAL CODEWORD SETS AND REPRESENTATIONS OF THE INTEGERS, IEEE Transactions on Information Theory, Vol. 21, No. 2, pp. 194–203, March 1975, which is hereby incorporated by reference; David A. Huffman, A METHOD FOR CONSTRUCTION OF MINIMUM REDUNDANCY CODES, In Proceedings of the Institute of Radio Engineers, Vol. 40, pp. 1098–1101. Institute of Radio Engineers, September 1952, which is hereby incorporated by reference; Jorma Rissanen, UNIVERSAL CODING, INFORMATION, PREDICTION, AND ESTIMATION, IEEE Transactions on Information Theory, Vol. 30, No. 4, pp. 629–636, July 1984, which is hereby incorporated by reference; Jorma Rissanen and Jr. Glen G. Langdon, UNIVERSAL MODELING AND CODING, IEEE Transactions on Information Theory, Vol. 27, No. 1, pp. 12–23, January 1981, which is hereby incorporated by reference; Jacob Ziv and Abraham Lempel, A UNIVERSAL ALGORITHM FOR SEQUENTIAL DATA COMPRESSION, IEEE Transactions on Information Theory, Vol. 23, No. 3, pp. 337–343, May 1977, which is hereby incorporated by reference; Jacob Ziv and Abraham Lempel, COMPRESSION OF INDIVIDUAL SEQUENCES VIA VARIABLE-RATE CODING, IEEE Transactions on Information Theory, Vol. 24, No. 5, pp. 530–536, September 1978, which is hereby incorporated by reference.)

As previously described in this detailed description of the drawings, encoded scaling vector or the scaling vector and the mantissa for each of the transformed digital communication signals are provided to the multiplexer 110 for multiplexing (i.e., sending the multiple transformed digital communication signals on the same channel). The multiplexer 110 can implement any number of multiplexing schemes in accordance with the present invention. For example, and according to a preferred embodiment of the present invention, a TDM scheme is used to interleave the bits or groups of bits. However, the present invention is applicable to other multiplexing schemes such as TDMA, FDMA, FDM, OFDM, OFDMA, CDMA and wavelength multiplexing as well as using packet labeling schemes that use different addresses to identify the different multiplexed signals such as Multiprotocol Label Switching (MPLS) or Asynchronous Transfer Mode (ATM). The multiplexed communication signal generated by the multiplexer 110 is provided at the multiplexer output 128. The multiplexed communication signal provided at the multiplexer output 128 is preferably post-processed and preferably transmitted with a single or multiple antenna configuration.

Figure 4:
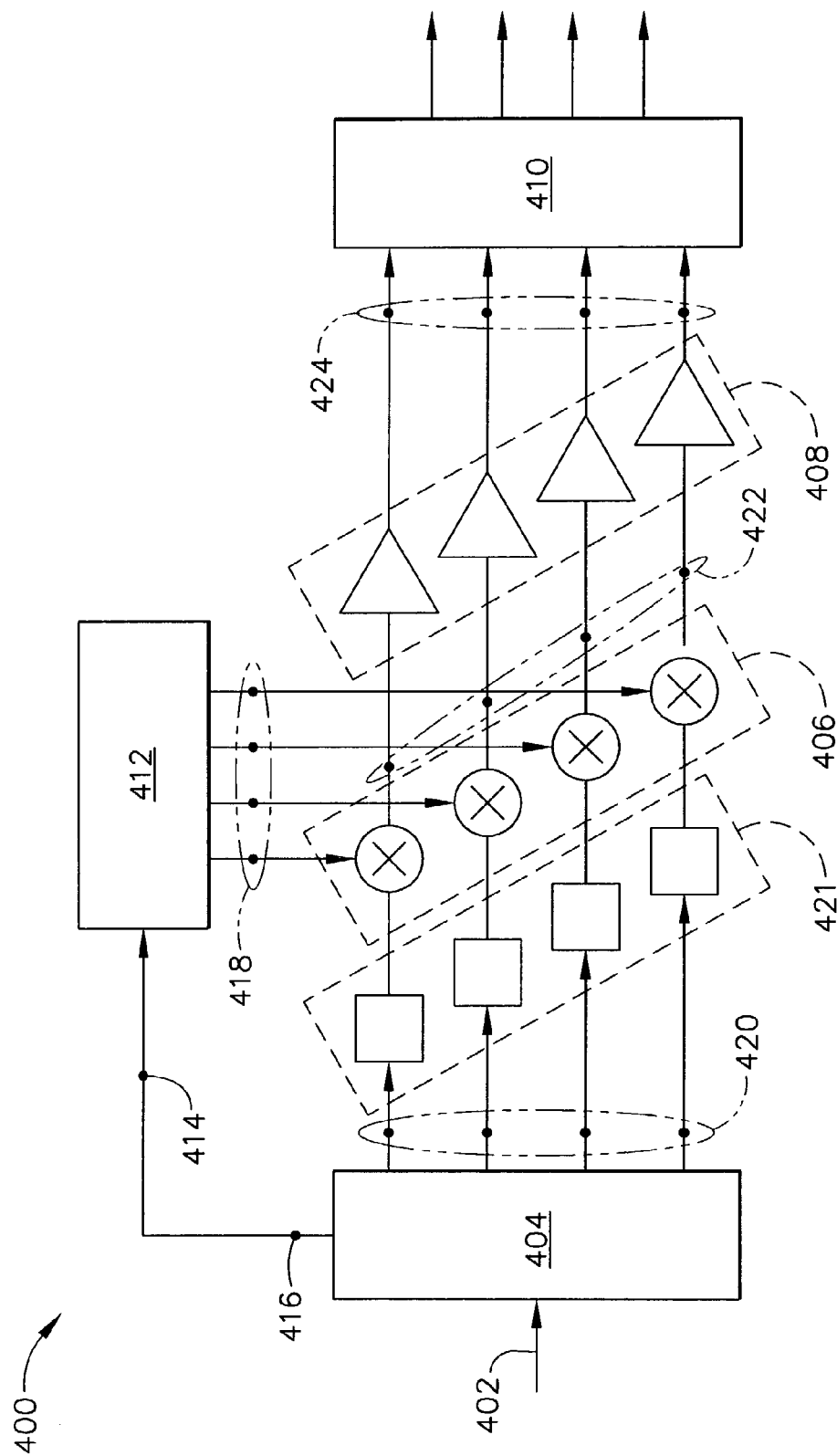

Referring to FIG. 4, an apparatus 400 is illustrated for processing a multiplexed communication signal according to preferred embodiment of the present invention, and preferably configured to process the multiplexed communication signal formed by the apparatus 400 described with reference to FIGS. 1–3. Generally, the apparatus 400 comprises a multiplexed signal input 402 configured to receive the multiplexed communication signal and a demultiplexer 404 that is configured to demultiplex the multiplexed communication signal to produce digital mantissas and the scaling vector, which is preferably the encoded scaling vector as previously described in this detailed description of the drawings. The apparatus 400 also preferably comprises a processor 412 configured to decode the encoded scaling vector and produce a decoded scaling vector, and an operator 406 that is configured to produce digital communication signals for each of the digital mantissas with the decoded scaling vector. In addition, the apparatus 400 comprises modulators 408 configured to convert the digital communication signals to analog communication signals. Furthermore, the apparatus 400 comprises a transform matrix 410 that is configured to transform the analog signals into transformed communication signals.

More specifically, and with continuing reference to FIG. 4, the multiplexed communication signal received at the multiplexed input 402 is provided to the demultiplexer 404 to separate (i.e., demultiplex) the mantissas and the scaling vector. Preferably, the demultiplexer 404 separates the mantissas and the encoded scaling vector, which is provided to a processor 412 at a processor input 414 that is coupled to a demultiplexer output 416. The processor 412, which can be implemented with software, hardware, or a combination of hardware and software, receives the encoded scaling vector and decodes the encoded scaling vector to produce the scaling vector for each of the mantissas (i.e., produces the exponent for each of the mantissas. The decoding operation performed by the processor 412 corresponds to encoding scheme used by the processor 106 described with reference to FIG. 1. For example, the decoding operation for the encoding method describe with reference to FIG. 3 would comprise adding the difference for each element to the minimum exponent and the decoding operation for encoding method described with reference to FIG. 4 would comprise subtracting the difference for each element from the maximum exponent. However, these examples are not intended to limit the invention as other decoding operations are within the scope of the present invention.

Once the scaling vector is decoded by the processor 412 or the scaling vector that was not originally encoded is produced by the demultiplexer, the scaling vector and the mantissa are provided to an operator 406, which in a preferred embodiment comprises one or more multipliers. The operator 406 is coupled to processor outputs 418 and/or the demultiplexer outputs 420 to receive the scaling vector and the mantissas, and the operator 406 produces the digital communication signals for each of the mantissas and the corresponding scaling vectors at operator outputs 422. Preferably, the operator 406 is coupled to the demultiplexer outputs 420 with delays 421 to synchronize the digital mantissas produced by the demultiplexer 404 with the decoded scaling vector produced by the processor 412 if such decoding is performed by the processor 412.

The operator outputs 422 are coupled to one or more modulators 408 that are configured to convert the digital communication signals to analog communication signals. The analog communication signals produced by the modulators 408 are provide at modulator outputs 424 that are coupled to the transform matrix 410. The transform matrix 410 is configured to transform the analog signals into transformed communication signals using methods and apparatus well known to those of ordinary skill in the art.

From the foregoing description, it should be appreciated that methods and apparatus are provided for generating a multiplexed communication signal. The methods and apparatus present significant benefits that would be apparent to one or ordinary skill in the art. Furthermore, while a preferred exemplary embodiment has been presented in the foregoing description of the drawings, it should be appreciated that a vast number of variations in the embodiments exist. Lastly, it should be appreciated that these embodiments are preferred exemplary embodiments only, and are not intended to limit the scope, applicability, or configuration of the invention in any way. Rather, the foregoing detailed description provides those skilled in the art with a convenient road map for implementing a preferred exemplary embodiment of the invention. It being understood that various changes may be made in the function and arrangement of elements described in the exemplary preferred embodiment without departing from the spirit and scope of the invention as set forth in the appended claims.

What is claimed is:

1. A method for generating a multiplexed communication signal in a wireless communication system, comprising:
   receiving a plurality of digital communication signals;
   transforming said plurality of digital communication signals into a plurality of transformed digital communication signals;
   determining a scaling vector for said plurality of transformed digital communication signals;
   generating a mantissa for each of said plurality of transformed digital communication signals with said scaling vector; and
   multiplexing said mantissa for each of said plurality of transformed digital communication signals and said scaling vector to produce the multiplexed communication signal.

2. The method for generating the multiplexed communication signal of claim 1, further comprising encoding said scaling vector.

3. The method for generating the multiplexed communication signal of claim 2, wherein said encoding said scaling vector comprises:
   determining a minimum exponent of said scaling vector;
   calculating a difference between each of the exponents of said scaling vector and said minimum exponent; and
   forming an encoded scaling vector from said minimum exponent and said difference between each of the exponents of said scaling vector and said minimum exponent.

4. The method for generating the multiplexed communication signal of claim 2, wherein said encoding said scaling vector comprises:
   determining a maximum exponent of said scaling vector;
   calculating a difference between said maximum exponent of said scaling vector and each of the exponents of said scaling vector; and
   forming an encoded scaling vector from said maximum exponent and said difference between said maximum exponent and each of the exponents of said scaling vector.

5. The method for generating the multiplexed communication signal of claim 2, wherein said encoding said scaling vector is a Huffman encoding of said scaling vector.

6. The method for generating the multiplexed communication signal of claim 1, wherein said multiplexing said mantissa for each of said plurality of transformed digital communication signals and said scaling vector to produce the multiplexed communication signal comprises Time Division Multiplexing (TDM) said mantissa for each of said plurality of transformed digital communication signals and said scaling vector.

7. The method for generating the multiplexed communication signal of claim 1, wherein said wireless communication system is a satellite communication system.

8. The method for generating the multiplexed communication signal of claim 1, wherein said plurality of digital communication signals are Third Generation Partnership Project (3GPP) Wideband Code Division Multiple Access (WCDMA) Direct Sequence Spread Spectrum (DSSS) signals.

9. The method for generating the multiplexed communication signal of claim 1, wherein transforming comprises transforming said plurality of digital communication signals utilizing a Fourier transform matrix.

10. The method for generating the multiplexed communication signal of claim 1, wherein transforming comprises transforming said plurality of digital communication signals utilizing a Butler transform matrix.

11. The method for generating the multiplexed communication signal of claim 1, wherein transforming comprises transforming said plurality of digital communication signals utilizing a digital transform matrix.

12. The method for generating the multiplexed communication signal of claim 1, further comprising:
   evaluating the transformed digital communication signals for a saturation condition; and
   correcting said saturation condition if said saturation condition exists.

13. An apparatus for generating a multiplexed communication signal in a wireless communication system, comprising:
   a plurality of inputs configured to receive a plurality of digital communication signals;
   a transform matrix configured to transform said plurality of digital communication signals into a plurality of transformed digital communication signals;
   a processor configured to generate a scaling vector for said plurality of transformed digital communication signals;
   a plurality of multipliers configured to produce a mantissa for each of said plurality of transformed digital communication signals with said scaling vector and said plurality of transformed digital communication signals; and
   a multiplexer configured to multiplex said mantissa for each of said plurality of transformed digital communication signals and said scaling vector to produce multiplexed communication signal.

14. The apparatus for generating the multiplexed communication signal of claim 13, wherein said processor is configured to encode said scaling vector.

15. The apparatus for generating the multiplexed communication signal of claim 14, wherein said processor is configured to:
   determine a minimum exponent of said scaling vector;
   calculate a difference between each of the exponents of said scaling vector and said minimum exponent; and
   form an encoded scaling vector from said minimum exponent and said difference between each of the exponents of said scaling vector and said minimum exponent.

16. The apparatus for generating the multiplexed communication signal of claim 14, wherein said processor is configured to:
   determine a maximum exponent of said scaling vector;
   calculate a difference between said maximum exponent of said scaling vector and each of the exponents of said scaling vector; and
   form an encoded scaling vector from said maximum exponent and said difference between said maximum exponent and each of the exponents of said scaling vector.

17. The apparatus for generating the multiplexed communication signal of claim 14, wherein said processor is configure to perform a Huffman encoding to encode said scaling vector.

18. The apparatus for generating the multiplexed communication signal of claim 13, wherein said multiplexer is configured to Time Division Multiplexing (TDM) said mantissa for each of said plurality of transformed digital communication signals and said scaling vector.

19. The apparatus for generating the multiplexed communication signal of claim 13, wherein said wireless communication system is a satellite communication system.

20. The apparatus for generating the multiplexed communication signal of claim 13, wherein said plurality of digital communication signals are Third Generation Partnership Project (3GPP) Wideband Code Division Multiple Access (WCDMA) Direct Sequence Spread Spectrum (DSSS) signals.

21. The apparatus for generating the multiplexed communication signal of claim 13, wherein said transform matrix is a Fourier transform matrix.

22. The apparatus for generating the multiplexed communication signal of claim 13, wherein said transform matrix is a Butler transform matrix.

23. The apparatus for generating the multiplexed communication signal of claim 13, wherein said transform matrix is a digital transform matrix.

24. The apparatus for generating the multiplexed communication signal of claim 13, wherein said processor is configured to evaluate the transformed digital communication signals for a saturation condition and correct said saturation condition if said saturation condition exists.

* * * * *